United States Patent [19]

Fukunaga et al.

[11] Patent Number: 5,407,041
[45] Date of Patent: Apr. 18, 1995

[54] LOCK-UP DEVICE FOR TORQUE CONVERTER

[75] Inventors: Takao Fukunaga; Seiji Ikeda, both of Neyagawa, Japan

[73] Assignee: Kabushiki Kaisha Daikin Seisakusho, Osaka, Japan

[21] Appl. No.: 116,916

[22] Filed: Sep. 7, 1993

[30] Foreign Application Priority Data

Sep. 7, 1992 [JP] Japan .................................. 4-62613 U

[51] Int. Cl.⁶ ............................................. F16H 45/02
[52] U.S. Cl. ................................... 192/3.29; 192/3.3
[58] Field of Search .............................. 192/3.29, 3.3

[56] References Cited

U.S. PATENT DOCUMENTS

| | | | |
|---|---|---|---|
| 2,793,726 | 5/1957 | Jandasek | 192/3.29 |
| 3,151,717 | 10/1964 | Kaptur et al. | 192/3.29 |
| 3,185,273 | 5/1965 | Smirl | 192/3.3 |
| 5,209,330 | 5/1993 | MacDonald | 192/3.29 |
| 5,211,270 | 5/1993 | Tamura et al. | 192/3.29 |

FOREIGN PATENT DOCUMENTS 1193744  5/1965 Germany ........................ 192/3.29

Primary Examiner—Richard M. Lorence
Attorney, Agent, or Firm—Knobbe, Martens, Olson & Bear

[57] ABSTRACT

A lock-up device is used for a torque converter comprising a front cover connected to an input-side rotation member, an impeller fixed to the front cover, and a turbine provided opposite to the impeller and connected to an output-side member. This lock-up device comprises a plate member and a piston. The above described plate member is connected to the output-side member and located between the turbine and the inner wall of the front cover, and can be brought into contact with the inner wall of the front cover. The above described piston which is connected to the front cover so as not to be relatively rotatable is for pressing the plate member against the inner wall of the front cover.

18 Claims, 2 Drawing Sheets

LOCK-UP DEVICE FOR TORQUE CONVERTER

BACKGROUND OF THE INVENTION

The present invention relates to a lock-up device for a torque converter.

A torque convertor is a device having a tubular toroid composed of three types of vane wheels (an impeller, a turbine, and a stator) for transmitting power by a hydraulic fluid contained therein. The impeller is fixed to a front cover connected to an input-side rotation member. The turbine driven by the hydraulic fluid flowing in from the impeller is connected to an output-side member.

There has been a torque converter in which a lock-up device is disposed between a turbine and a front cover. Such a lock-up device is for directly transmitting torque to an output-side member from the front cover. The lock-up device generally comprises a piston connected to tile output-side member such as a turbine shell. A frictional member is fixed to the side surface of the piston. If this frictional member abuts on the frictional surface of the front cover, torque produced by tile front cover is mechanically transmitted to tile output-side member through the piston.

In the above described conventional case, the lock-up device has only one frictional surface. If engine torque is increased, the torque transmission capacity of the lock-up device may, in some cases, be insufficient.

In order to increase the torque transmission capacity of the lock-up device, it is considered that the area of the frictional surface between the piston and the front cover is increased. In this case, however, it is necessary to increase the outer diameter of the front cover. Consequently, the size of the torque converter is increased In the radial direction.

Furthermore, an attempt has been made to increase the torque transmission capacity by employing a multiple disk clutch for the lock-up device. In the multiple disk clutch, however, at least more than two plates must be arranged between the piston and the front cover. Consequently, the size of the torque converter is increased in the axial direction.

SUMMARY OF THE INVENTION

An object of the present invention is to increase the torque transmission capacity of a lock-up device without increasing the size of the device.

A lock-up device for a-torque convertor according to one aspect of the present invention is used for a torque converter comprising a front cover connected to an input-side rotation member, an impeller fixed to the front cover, and a turbine provided opposite to the impeller and connected to an output-side member. This lock-up device comprises a plate member and a piston. The plate member is connected to the output-side member between the turbine and the inner wall of the front cover, and can be brought into contact with the inner wall of the front cover. The piston is connected to the front cover so as not to be relatively rotatable, and is used for bringing the plate member into contact with the inner wall of the front cover by pressure.

In this lock-up device for a torque converter, if the plate member is brought into contact with the inner wall of the front cover by pressure using the piston, torque produced by the front cover is transmitted to the output-side member through the plate member. At this time, two surfaces, that is, a frictional surface between the inner wall of the front cover and the plate member and a frictional surface between the plate member and the piston are frictionally engaged with each other, whereby the torque transmission capacity is increased, as compared with the conventional lock-up device having one frictional engaging surface.

Moreover, in tills lock-up device, the torque transmission capacity can be increased by only providing one plate member between the piston and the front cover, whereby the size of the device is not increased in-the radial direction or in the axial direction.

The foregoing and other objects, aspects and advantages of the present invention will become more apparent from the following detailed description.

DESCRIPTION OF THE PREFERRED EMBODIMENTS

Figure 1:
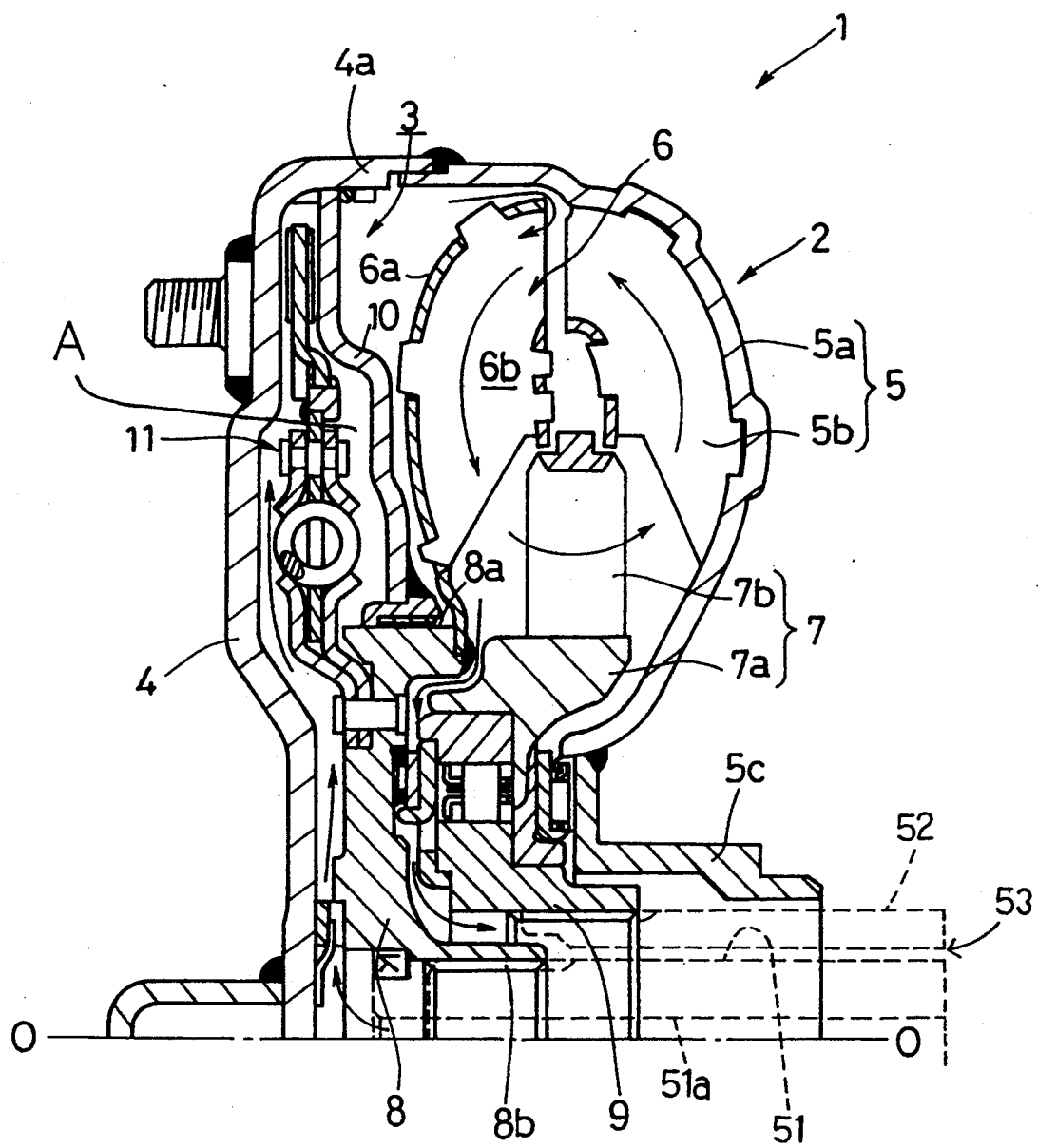
FIG. 1 is a partially longitudinal sectional view showing a torque converter to which one embodiment of the present invention is applied.

FIG. 1 illustrates a torque converter 1 to which one embodiment of the present embodiment is applied. In FIG. 1, O—O represents a rotational axis of the torque converter 1.

The torque converter 1 is mainly composed of a tubular toroid 2 and a lock-up device 3. A front cover 4 which is connectable to an engine (not shown) is in a disk shape, and has a cylindrical projection 4a in its radially outer portion. An impeller shell 5a in an impeller 5 is fixed to this projection 4a. The front cover 4 and the impeller shell 5a form a hydraulic fluid chamber which is filled with a hydraulic fluid.

The tubular toroid 2 is mainly composed of the impeller 5, a turbine 6, and a stator 7. A plurality of impeller blades 5b are fixed in the impeller shell 5a in the impeller 5. The impeller shell 5a has its radially inner end fixed to an impeller hub 5c. The turbine 6 is disposed in a position opposite to the impeller 5. The turbine 6 comprises a turbine shell 6a and a plurality of turbine blades 6b fixed to the turbine shell 6a. A radially inner end of the turbine shell 6a is welded to a radially outer portion of a turbine hub 8. The turbine hub 8 has in its radially inner portion a spline 8b engaged with a shaft 51 of a transmission. The stator 7 is disposed between a radially inner portion of the impeller 5 and a radially inner portion of the turbine 6. The stator 7 is for adjusting the direction of the hydraulic fluid which is returned to the impeller 5 from the turbine 6, and comprises an annular stator carrier 7a and a plurality of stator blades 7b provided on a radially outer surface of the stator carrier 7a. The stator carrier 7a is connected to an inner race 9 through a one-way clutch mechanism. The inner race 9 is connected to a fixed shaft 52 extending from a housing (on the right side in FIG. 1).

Figure 2:
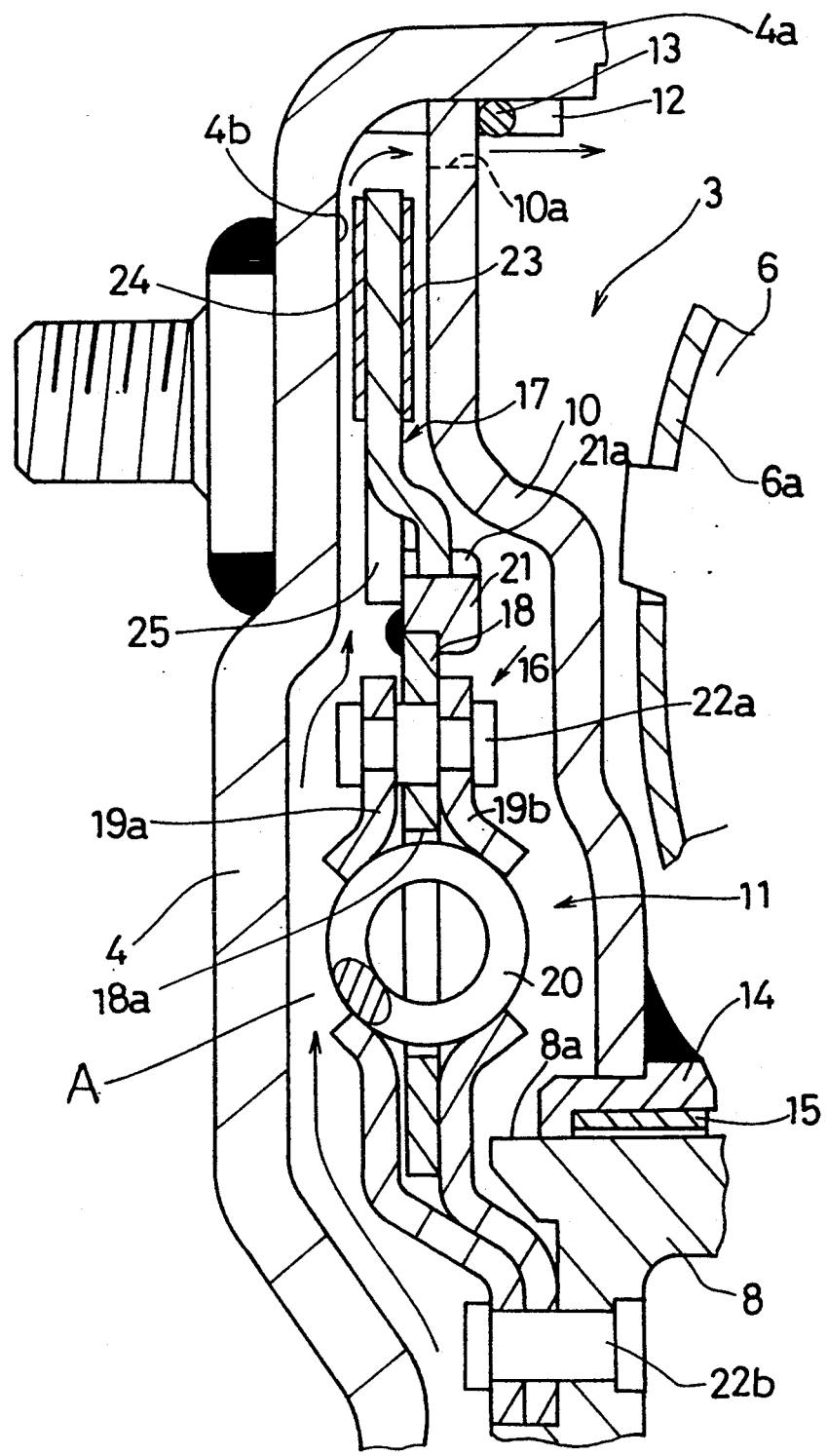
FIG. 2 is a partially longitudinal sectional view showing a lock-up device for the torque converter.

The lock-up device 3 is disposed between the front cover 4 and the turbine shell 6a in the turbine 6. The lock-up device 3 illustrated in detail in FIG. 2 is mainly composed of a disk-shaped piston 10 and a damper disk 11.

The piston 10 causes a space between the front cover 4 and the turbine shell 6a to be divided In the axial direction. The piston 10 has in its radially outer end a spline part 10a engaged with a plurality of engaging projections 12 provided with circumferentially equal spacing and parallel to the rotational axis O—O on a radially inner surface of the cylindrical projection 4a in the front cover 4. By this engagement, the piston 10 becomes an input-side member rotated integrally with the front cover 4 and Is axially movable. A wire ring 13 is mounted on the engaging projections 12 on the side of the turbine 6. This wire ring 13 prevents the piston 10 from being moved by not less than a predetermined amount toward the turbine shell 6a. A groove of the spline part 10a in tile piston 10 is formed so as to have a depth larger than the radial length of the engaging projections 12 so that the hydraulic fluid can easily pass through a clearance between the groove and the engaging projections 12.

A cylindrical member 14 is welded to a radially inner end of the piston 10. The cylindrical member 14 is supported on an outer peripheral surface 8a of the turbine hub 8 through a bush 15 so as to be rotatable and so as to be axially movable. By such construction, the piston 10 is positioned in the radial direction in its radially inner end.

The damper disk 11 is disposed In a space A between the front cover 4 and tile piston 10. The damper disk 11 is mainly composed of an elastic connecting mechanism 16 and a plate 17. The elastic connecting mechanism 16 comprises a disk-shaped drive plate 18, a pair of driven plates 19a and 19b provided on both sides of the drive plate 18, a coil spring 20 elastically connecting the drive plate 18 and the driven plates 19a and 19b in the direction of rotation, and an annular member 21 welded to a radially outer end of the drive plate 18 and having a spline 21a formed in its radially outer portion. The drive plate 18 has a plurality of window holes 18a extending in the circumferential direction, and the coil spring 20 is disposed in the window holes 18a. The driven plates 19a and 19b respectively have raised portions formed for holding time coil spring 20 in the axial direction and abutting on both its circumferential ends. The driven plates 19a and 19b are connected to each other by a plurality of rivets 22a in their radially outer ends, and are connected to the turbine hub 8 by a plurality of rivets 22b in their radially inner ends. Holes extending in the circumferential direction are provided in positions which correspond to the rivets 22a of the drive plate 18, thereby to allow relative rotation of the drive plate 18 and the driven plates 19a and 19b.

A plate 17 is formed in an annular shape, and a portion of its radially inner portion is deformed to produce a bias force in the axial direction. A spline is formed in the biased portion, and is engaged with the annular member 21a. Therefore, the plate 17 is rotated integrally with the annular member 21, and is axially movable. In addition, an unbiased portion 25 in the radially inner portion of the plate 17 becomes a preventing part 25 which can abut on the side surface of the annular member 21 from the left in FIG. 2 for preventing the plate 17 from being moved toward the piston 10.

Frictional members 23 and 24 are fixed to both surfaces of the radially outer portion of the plate 17. A frictional surface 4b is formed on an inner wall, which is opposite to the plate 17, of the flywheel 4.

An oil passage 51a connecting to a hydraulic controller (not shown) is formed in the shaft 51. The hydraulic controller can supply and discharge the hydraulic fluid to and from the space A from the radially inner portions of the turbine hub 8 and the front cover 4. In addition, a clearance 53 is formed between the shaft 51 and the fixed shaft 52. The clearance 53 has its end connecting to the hydraulic controller and has the other end disposed between the stator 7 and the turbine hub 8. The hydraulic controller can supply and discharge the hydraulic fluid to and from the tubular toroid 2 from a space between the stator 7 and the turbine 8 through the clearance 53.

Description is now made of operations according to the above described embodiment.

When an engine (not shown) is rotated, torque is inputted to the front cover 4. Consequently, the impeller 5, along with the front cover 4, is rotated. The torque is transmitted to tile turbine 6 through a hydraulic fluid. The flow of the hydraulic fluid from the turbine 6 to the impeller 5 is adjusted by the stator 7. The rotation of the turbine 6 is transmitted to the shaft 51 of the transmission through the turbine hub 8. In this region to which the torque is transmitted by the tubular toroid 2, the hydraulic fluid is supplied to the space A through the oil passage 51a by the hydraulic controller (not shown). The hydraulic fluid flows from the clearance in the spline part 10a in the piston 10 toward the tubular toroid 2 flows into the tubular toroid 2 from an exit of the impeller 5 and an entrance of the turbine 6, and circulates in the tubular toroid 2. The hydraulic fluid in the tubular toroid 2 flows out to the clearance 53 from a clearance between the stator carrier 7a and the turbine hub 8. The above described flow of the hydraulic fluid is shown in arrows in FIGS. 1 and 2.

At the time of locking, the above described directions in which the hydraulic fluid is supplied and discharged are respectively reversed by the hydraulic controller (not shown). Specifically, the hydraulic fluid is supplied to tile tubular toroid 2 from the clearance between the stator carrier 7a and the turbine hub 8, and the hydraulic fluid in the space A is discharged into the oil passage 51a. As a result, the hydraulic fluid in the space A is drained, whereby the piston 10 is moved toward the front cover 4 to bring the plate 17 into contact with the frictional surface 4b of the front cover 4 by pressure. At this time, both surfaces of the plate 17 become frictional engaging surfaces. Consequently, transmitted torque is increased, as compared with the lock-up device having one frictional engaging surface.

Torque transmitted to the plate 17 is transmitted to the drive plate 18, is further transmitted to the driven plates 19a and 19b through the coil spring 20, and is further transmitted to the turbine hub 8. Shock, torsional vibration and the like at the time of engaging the clutch are alleviated by the coil spring 20.

At tile time of releasing the locking, the hydraulic fluid flows from the radially inner portion to the radially outer portion of the space A, as described above. By the flow of the hydraulic fluid, the piston 10 and the plate 17 are moved toward the turbine 6, to release the locking. Since the piston 10 abuts on the wire ring 13 in its radially outer end, not to be further moved, the contact with the turbine 6 is prevented. In addition, the plate 17 is prevented from being moved toward the piston 10 because the preventing part 25 abuts on the side surface of the annular member 21. Therefore, a predetermined clearance is ensured between the piston 10 and the plate 17 so that drag torque is not easily produced.

In the present embodiment, a radial clearance is ensured between the spline part 10a and the engaging projection 12 irrespective of the fact that the piston 10 causes a space between the front cover 4 and the turbine shell 6a to be divided in the axial direction. Accordingly, the hydraulic fluid can circulate in the space A and on the side of the tubular toroid 2. Therefore, the lock-up device 3 according to the present invention can be adopted without altering the conventional flow of the hydraulic fluid. Furthermore, in the present embodiment, a clearance is provided in the radially outer portion of the piston 10 to circulate the hydraulic fluid, thereby to make positioning in the radial direction difficult in an engaging part in the radially outer portion. Therefore, the radially inner end of the piston 10 is supported on the turbine hub 8 through the bush 15 to cause positioning in the radial direction. Therefore, reliable positioning (centering) is allowed while providing a sufficient clearance in the engaging part in the radially outer portion, thereby to make it possible to smoothly move the piston 10 in the axial direction.

Various details of the invention may be changed without departing from its spirit nor its scope. Furthermore, the foregoing description of the embodiment according to the present invention is provided for the purpose of illustration only, and not for the purpose of limiting the invention as defined by the appended claims and their equivalents.

What is claimed is:

1. A lock-up device in combination with a torque converter comprising a front cover having a disk part connected to an input-side rotation member and a cylindrical wall extending in the axial direction from a radially outer portion of said disk part, an impeller fixed to the cylindrical wall of said front cover, and a turbine having a turbine hub fixed to an output-side shaft, comprising:

a plate member which is disposed in an axial space between said turbine and the inner wall of the disk part of said front cover, said plate member being an annular member having frictional engaging parts on both surfaces;

a piston which is disk-shaped and connected to said front cover for pressing said plate member against the inner wall of the disk part of said front cover to interpose said plate member between the piston and the inner wall of the disk part of said front cover;

a connecting mechanism which is disposed in an axial space between said piston and the inner wall of the disk part of said front cover, has its radially inner portion fixed to said turbine hub, and has its radially outer portion connected to said plate member;

a plurality of projections provided at a radially outer end of said piston for engaging with a plurality of engaging parts formed inside said cylindrical wall of said front cover, said plurality of engaging parts being provided with a member for preventing said piston from being moved toward said turbine;

a clearance ensured in a radial space between the plurality of projections of said piston and said engaging parts; and a hydraulic fluid discharged in the space between the inner wall of the disk part of said front cover and said piston for moving said piston toward the disk part of said front cover at the time of locking, said hydraulic fluid being supplied to said space to move said piston toward said turbine at the time of releasing said locking when the hydraulic fluid flows from said space to said turbine in said clearance.

2. The lock-up device according to claim 1, wherein:

a radially outer portion of said piston is a pressure part for pressing the frictional engaging parts of said plate member against the inner wall of the disk part of said front cover; and a radially inner end of said piston is supported on a radially outer portion of said turbine hub so as to be axially and circumferentially slidable.

3. The lock-up device according to claim 2, further comprising
   a cylindrical member fixed to the radially inner end of said piston and a bush supported between a radially inner portion of said cylindrical member and said turbine hub so as to be rotatable.

4. The lock-up device according to claim 3, further comprising
   a preventing part for preventing said plate member from being moved toward said piston.

5. The lock-up device according to claim 4, wherein said plate member has said preventing part abutting on the radially outer portion of said connecting mechanism for preventing said plate member from being moved toward said piston.

6. The lock-up device according to claim 5, wherein:
   a radially inner portion of said plate member is deformed to produce a bias force in the axial direction, said biased portion is engaged with the radially outer portion of said connecting mechanism, and an unbiased portion is disposed as said preventing part on the opposite side to said piston in the radially outer portion of said connecting mechanism.

7. The lock-up device according to claim 6, wherein said connecting mechanism comprises a drive member with which said plate member is engaged, a driven member connected to said turbine hub, and an elastic member for elastically connecting said drive member and said driven member in the circumferential direction.

8. The lock-up device according to claim 7, wherein:
   said drive member comprises a disk-shaped member connected to said driven member through said elastic member, and an annular member fixed to a radially outer portion of said disk-shaped member and having in its radially outer portion an engaging part with which a radially inner end of said plate member is engaged.

9. A lock-up device in combination with a torque converter comprising a front cover having a disk part connected to an input-side rotation member and a cylindrical wall extending in the axial direction from a radially outer portion of said disk part, an impeller fixed to the cylindrical wall of said front cover, and a turbine having a turbine hub fixed to an output-side shaft, comprising:

a plate member which is disposed in an axial space between said turbine and the inner wall of the disk part of said front cover;

a piston which is connected to said front cover for pressing said plate member against the inner wall of the disk part of said front cover to interpose said plate member between the piston and the inner wall of the disk part of said front cover, said piston being a disk-shaped member for dividing a space between the inner wall of the disk part of said front cover and said turbine in the axial direction;

a plurality of projections provided at a radially outer end of said piston for engaging with a plurality of engaging parts formed inside said cylindrical wall of said front cover, said plurality of engaging parts being provided with a member for preventing said piston from being moved toward said turbine;

a clearance ensured in a radial space between the plurality of projections of said piston and said engaging parts; and a hydraulic fluid discharged in the space between the inner wall of the disk part of said front cover and is for moving said piston toward the disk part of said front cover at the time of locking, said hydraulic fluid being supplied to said space to move said piston toward said turbine at the time of releasing said locking when the hydraulic fluid flows from said space to said turbine in said clearance.

10. The lock-up device according to claim 9, wherein
a radially outer portion of said piston is a pressure part for pressing frictional engaging parts of said plate member against the inner wall of the disk part of said front cover, and a radially inner end of said piston is supported on a radially outer portion of said turbine hub so as to be axially and circumferentially slidable.

11. The lock-up device according to claim 10, further comprising
a cylindrical member fixed to the radially inner end of said piston and a bush supported between a radially inner portion of said cylindrical member and the radially outer portion of said turbine hub so as to be rotatable.

12. A torque convertor, comprising:
an input-side rotation member;
an output-side rotation member;
a front cover having a disk part connected to said input-side rotation member and a cylindrical wall extending in the axial direction from a radially outer portion of said disk part;
a tubular toroid comprising an impeller fixed to the cylindrical wall of said front cover, a turbine having a turbine hub fixed to said output-side shaft, and a stator disposed between said impeller land a radially inner portion of the turbine for transmitting power by a hydraulic fluid flowing from said impeller to said turbine; and
a lock-up device provided in an axial space between the inner wall of the disk part of said front cover and said turbine;
said lock-up device comprising:
a plate member which is connected to said turbine hub and can be brought into contact with the inner wall of the disk part of said front cover, said plate member is an annular member having frictional engaging parts on both surfaces; and
a piston which is disk-shaped and connected to said front cover so as not to be relatively rotatable for pressing said plate member against the inner wall of the disk part of said front cover to interpose said plate member between the piston and the inner wall of the disk part of said front cover;
a connecting mechanism which is disposed in an axial space between said piston and the inner wall of the disk part of said front cover, has its radially inner portion fixed to said turbine hub, and has its radially outer portion connected to said plate member;
a plurality of projections provided at a radially outer end of said piston for engaging with a plurality of engaging parts formed inside said cylindrical wall of said front cover, said plurality of engaging parts being provided with a member for preventing said piston from being moved toward said turbine;

a clearance ensured in a radial space between the plurality of projections of said piston and said engaging parts; and a hydraulic fluid discharged in the space between the inner wall of the disk part of said front cover and said piston for moving said piston toward the disk part of said front cover at the time of locking, said hydraulic fluid being supplied to said space to move said piston toward said turbine at the time of releasing said locking when the hydraulic fluid flows from said space to said turbine in said clearance.

13. The torque converter according to claim 12 wherein:
a radially outer portion of said piston is a pressure part for pressing the frictional engaging parts of said plate member against the inner wall of the disk part of said front cover; and a radially inner end of said piston is supported on a radially outer portion of said turbine hub so as to be axially and circumferentially slidable.

14. The torque converter according to claim 13, further comprising
a cylindrical member fixed to the radially inner end of said piston and a bush supported between a radially inner portion of said cylindrical member and the radially outer portion of said turbine hub so as to be rotatable.

15. A torque convertor, comprising:
an input-side rotation member;
an output-side rotation member;
a front cover having a disk part connected to said input-side rotation member and a cylindrical wall extending in the axial direction from a radially outer portion of said disk part;
a tubular toroid comprising an impeller fixed to the cylindrical wall of said front cover, a turbine having turbine hub fixed to said output-side shaft, and a stator disposed between said impeller land a radially inner portion of the turbine for transmitting power by a hydraulic fluid flowing from said impeller to said turbine; and
a lock-up device provided in an axial space between the inner wall of the disk part of said front cover and said turbine;
said lock-up device comprising: a plate member which is connected to said turbine hub and can be brought into contact with the inner wall of the disk part of said front cover; and
a piston which is connected to said front cover for pressing said plate member against the inner wall of the disk part of said front cover to interpose said plate member between the piston and the inner wall of the disk part of said front cover, said piston being a disk-shaped member for dividing a space between the inner wall of the disk part of said front cover and said turbine in the axial direction;
a plurality of projections provided at a radially outer end of said piston for engaging with a plurality of engaging parts formed inside said cylindrical wall of said front cover, said plurality of engaging parts being provided with a member for preventing said piston from being moved toward said turbine;

a clearance ensured in a radial space between the plurality of projections of said piston and said engaging parts; and a hydraulic fluid discharged in the space between the inner wall of the disk part of said front cover and is for moving said piston toward the disk part of said front cover at the time of locking, said hydraulic fluid being supplied to said space to move said piston toward said turbine at the time of releasing said locking when the hydraulic fluid flows from said space to said turbine in said clearance.

16. The torque converter according to claim 15, wherein
    a radially outer portion of said piston is a pressure part for pressing the frictional engaging parts of said plate member against the inner wall of the disk part of said front cover, and
    a radially inner end of said piston is supported on a radially outer portion of said turbine hub so as to be axially and circumferentially slidable.

17. The torque converter according to claim 16, further comprising
    a cylindrical member fixed to the radially inner end of said piston and a bush supported between a radially inner portion of said cylindrical member and the radially outer portion of said turbine hub so as to be rotatable.

18. A lock-up device in combination with a torque converter comprising a front cover having a disk part connected to an input-side rotation member and a cylindrical wall extending in the axial direction from a radially outer portion of said disk part, an impeller fixed to the cylindrical wall of said front cover, and a turbine having a turbine hub fixed to an output-side shaft, comprising;
    a plate member which is disposed in an axial space between said turbine and the inner wall of the disk part of said front cover and connectable to said turbine hub, and can be brought into contact with the inner wall of the disk part of said front cover; and
    a piston which can be connected to said front cover so as not to be relatively rotatable, for pressing said plate member against the inner wall of the disk part of said front cover to interpose said plate member between said piston and the inner wall of the disk part of said front cover;
    said piston is a disk-shaped member for dividing a space between the inner wall of the disk part of said front cover and said turbine in the axial direction; and
    radially outer end of said piston is engaged with said cylindrical wall of said front cover, wherein a clearance is ensured between said piston and said cylindrical wall, whereby a hydraulic fluid in the space between the inner wall of the disk part of said front cover and said piston is discharged to move said piston toward the disk part of said front cover at the time of locking; and
    the hydraulic fluid is supplied to said space to move said piston toward said turbine at the time of releasing said locking, when the hydraulic fluid flows from said space to said turbine in said clearance.

* * * * *